United States Patent [19]

Christine et al.

[11] Patent Number: 4,947,621
[45] Date of Patent: Aug. 14, 1990

[54] VERTICAL FORM/FILL/SEAL MACHINE FOR MAKING THREE SIDE FIN POUCHES

[75] Inventors: Willilam C. Christine, Nazareth; George J. Herschman, Bath, both of Pa.

[73] Assignee: Triparte, Ltd., Nazareth, Pa.

[21] Appl. No.: 274,084

[22] Filed: Nov. 18, 1988

[51] Int. Cl.⁵ ............................. B65B 9/20; B65B 9/08
[52] U.S. Cl. ........................................ 53/451; 53/551; 493/193
[58] Field of Search ................. 53/450, 451, 551, 552, 53/373, 410, 128; 493/193, 209, 309

[56] References Cited

U.S. PATENT DOCUMENTS

| | | |
|---|---|---|
| 3,052,074 | 9/1962 | Dreeben ................................. 53/552 |
| 3,482,373 | 12/1969 | Morris ............................... 53/552 X |
| 3,894,381 | 7/1975 | Christine et al. |
| 4,246,062 | 1/1981 | Christine . |
| 4,534,159 | 8/1985 | Kelly ..................................... 53/552 |
| 4,583,352 | 4/1986 | Heron ............................... 53/373 X |
| 4,676,051 | 6/1987 | Hoskinson et al. ............... 53/552 X |
| 4,745,731 | 5/1988 | Talbott et al. ..................... 53/551 X |
| 4,829,745 | 5/1989 | Behr et al. ......................... 53/551 X |
| 4,829,746 | 5/1989 | Schmidt et al. ................... 53/551 X |

Primary Examiner—Horace M. Culver
Attorney, Agent, or Firm—Seidel, Gonda, Lavorgna & Monaco

[57] ABSTRACT

A vertical form, fill, seal machine for continuously making filled three sided fin pouches is disclosed herein. Mechanisms for controlling the thermoplastsic web so that the seals are improved are disclosed. One of the mechanisms ensures that equal lengths of web are fed into the sealing jaws. The other mechanism that is carried by the jaws grasps and tensions the web immediately before and during the sealing of the web.

18 Claims, 8 Drawing Sheets

VERTICAL FORM/FILL/SEAL MACHINE FOR MAKING THREE SIDE FIN POUCHES

FIELD OF THE INVENTION

A machine for and a method of forming, filling and sealing a three side fin flexible package is disclosed herein. The machine is of the type known in the industry as a vertical form/fill/seal machine.

BACKGROUND OF THE INVENTION

Known vertical form/fill/seal machines are disclosed in U.S. Pat. Nos. 3,894,381 to Christine et al. and 4,246,062 to Christine. In general, these machines take a continuous web of thermoplastic material; form it into a continuous sleeve by folding the web and welding its free edge portions together; fill the sleeve with a fluid material as the bottom is sealed shut; and seal the sleeve closed after filling is complete. The machines make and fill the flexible pouches in a continuous manner, so that the bottom seal for the unfilled pouch is usually made simultaneously with the top seal for the filled pouch. These seals are typically made by heat welding the thermoplastic web to itself, however, other sealing methods can be used.

The fluid filled flexible packages produced by the machines must have strong seals to resist bursting at and/or leakage from the seals which may result during handling and/or transport. The "drop test" measures the strength of these packages For example, the drop test for an intravenous (IV) solution pouch, which is suspended over a patient at a height of 5 to 6 feet above the floor, consists of repetitively dropping the filled pouch from a height of 5 to 6 feet. If the pouch withstands the drop, i.e. it does not burst or leak, it passes the test, otherwise it fails.

Bursting at and/or leakage from the seals is a problem with these types of packages. Particularly, the horizontal seals (i.e. top and bottom seals) are most susceptible to this problem. The problem arises, in part, due to dynamic forces on the pouch at the horizontal seal when it is made.

The principal dynamic force arises during fluid filling at the bottom horizontal seal. Before filling, the folded and side sealed web (or sleeve) is flat or two dimensional and is straight between the folded edge and the side fin (i.e. it has a square bottom). However, when fluid is filled into the sleeve, the fluid, seeking its own level, spreads the sleeve to a three dimensional shape by forcing outwardly the sides of the sleeve which in turn causes the bottom to assume a concave shape. This dynamic force exerts an outwardly directed force or spreading force on the bottom horizontal seal. The spreading force weakens the bottom horizontal seal.

Another dynamic force arises during certain special packaging operations. These special packaging operations include the packaging in an inert atmosphere, a nitrogen or other gas atmosphere, a sterile atmosphere and the like. During these operations, a chamber encloses a portion of the machine and the chamber is flooded with the desired atmosphere. The pressure of the flooding atmosphere is greater than the atmospheric pressure. The flooding atmosphere inflates the flat sleeve and deforms it as described above.

The seals, which are often formed by heat sealing, do not immediately solidify to a finished seal. Instead, a finite amount of time is required to heat the web to a welding temperature; hold the webs in bonding contact; release the hot bonded webs; and then allow the sealed web to cool to a finished seal. During cooling, the seal is particularly susceptible to the dynamic forces. Since the seal has not cooled to a finished seal, it has not obtained its greatest strength and the spreading forces pull the web apart, thereby weakening the seal. Additionally, fluid may enter the seal and further weaken it.

In one method, the horizontal seals have been formed by a hot wire which not only seals the web together but cuts one pouch from the next. The hot wire method forms seals with very small surface areas that do not have the strength of seals with greater surface areas. In another method, the horizontal seals have been formed by a pair of rectangular hot jaws with mating surfaces, which are knurled or have discontinuous patterns embossed thereon. These rectangular hot jaws are used to defeat the effects of the dynamic forces, however, they are not always effective.

A different factor affecting the bursting and leaking problem is pleating of the web at the seals. This pleating is due to unequal lengths of opposing webs being welded together. The pleat is an unwanted fold in the web which normally cannot be sealed shut. Thus, the pleat allows fluid to escape. Additionally, since this pleat represents at least two additional layers of material that must be welded together, the seal is weak and allows the pouch to leak.

In one method to overcome the pleating problem, a pair of spring fingers located within the sleeve and which hang down from the filling nozzle and which engage the folded edge and side seal of the sleeve ensure that equal amounts of web are welded together. However, the spring finger that engages the side seal causes weakening of that seal because the side seal is still in a softened state when engaged by the spring finger. Another apparatus used to overcome the pleating problem utilizes a single spring finger that engages the folded edge and a clamp that engages the side sealed edge. The clamp consists of two endless chains; one chain carries a plurality of pins and the other carries a plurality of sockets that mate with the pins. See U.S. patent application Ser. No. 389,098, filed June 16, 1982, now abandoned. The pins and sockets engage the selvage (i.e. that portion of the side sealed edge beyond the weld). The clamp on the sealed side of the sleeve and the spring finger on the folded side of the sleeve cooperate to ensure that equal lengths of web are welded at the horizontal seam. Moreover, the clamp ensures that the sealed edge of the sleeve is always delivered to the same spot on the sealing jaws. The pins, however, puncture the selvage. In some cases, the consumer deems such a pouch unattractive and it is not usable unless it is placed in some over-package, such as a box.

The foregoing problems and attempted solutions are associated with controlling the web as it passes through the machine.

A three side fin pouch refers to a generally rectangular pouch which includes seals on three sides (i.e. the top, bottom and one side) and a fold at the remaining side.

U.S. Pat. Nos. 3,894,381 and 4,246,062 are incorporated herein by reference.

SUMMARY OF THE INVENTION

A vertical form, fill, seal machine for producing filled three side fin pouches comprising:

means for forming a sheet of thermoplastic material into a sleeve having a folded edge portion and a side sealed edge portion;

means for spreading apart the sleeve between said folded edge portion and said side sealed edge portion so that equal lengths of thermoplastic material may be subsequently sealed together;

means for grasping said folded edge portion and said side sealed edge portion and for tensioning said sleeve between said folded edge portion and said side sealed edge portion;

means for sealing shut said sleeve between said folded edge portion and said side sealed edge portion;

means for filling said sleeve;

means for sealing shut said sleeve after filling thereby forming the filled three sided fin pouch;

means for separating the filled three side fin pouch from said sleeve; and means for deflating a filled pouch before the pouch is sealed shut.

DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
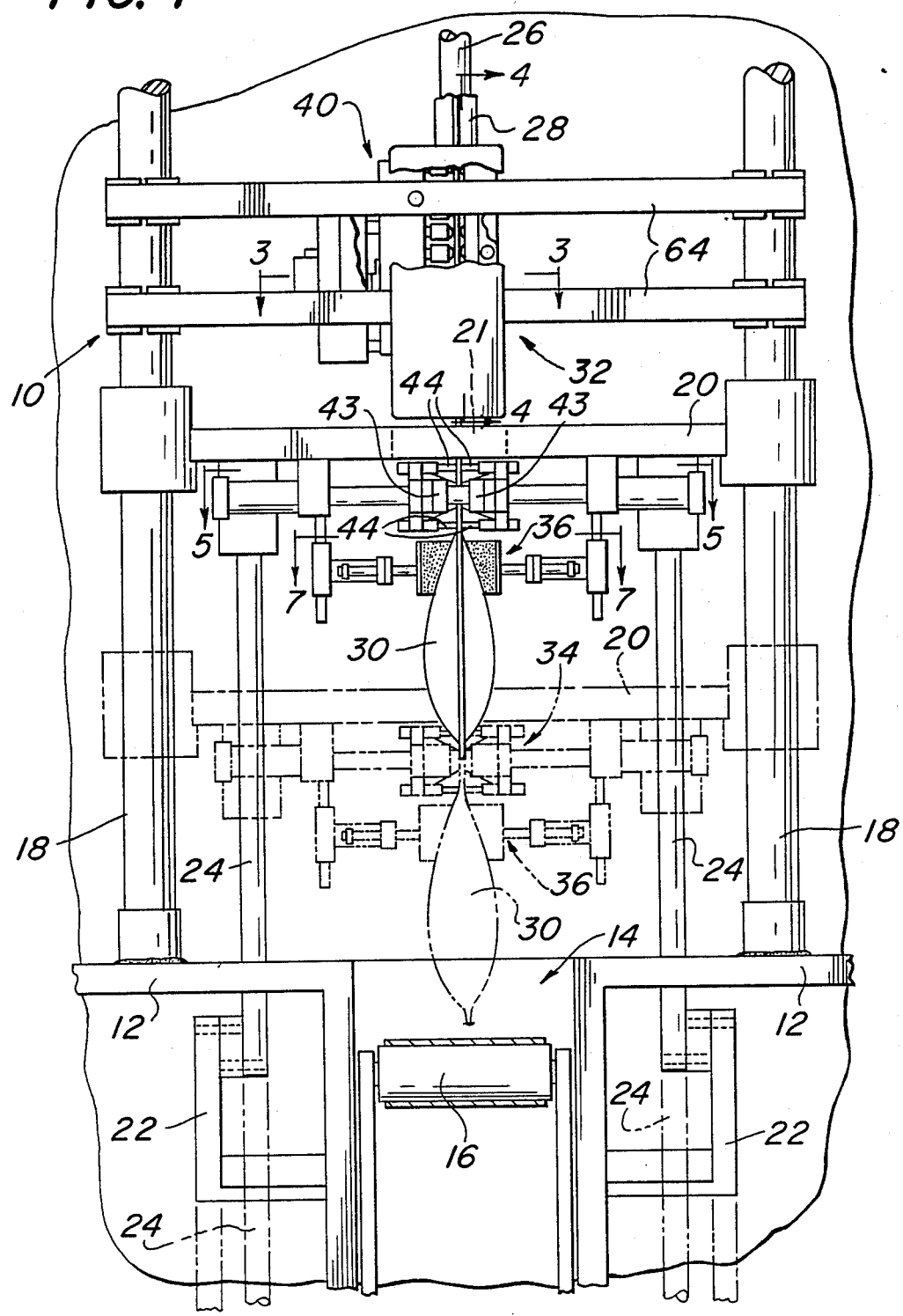
FIG. 1 is a front elevational view of a portion of a vertical form, fill, seal machine made according to the present invention.

Referring to the drawings wherein like numerals indicate like elements, there is shown in FIG. 1 a vertical form/fill/seal machine 10.

Figure 2:
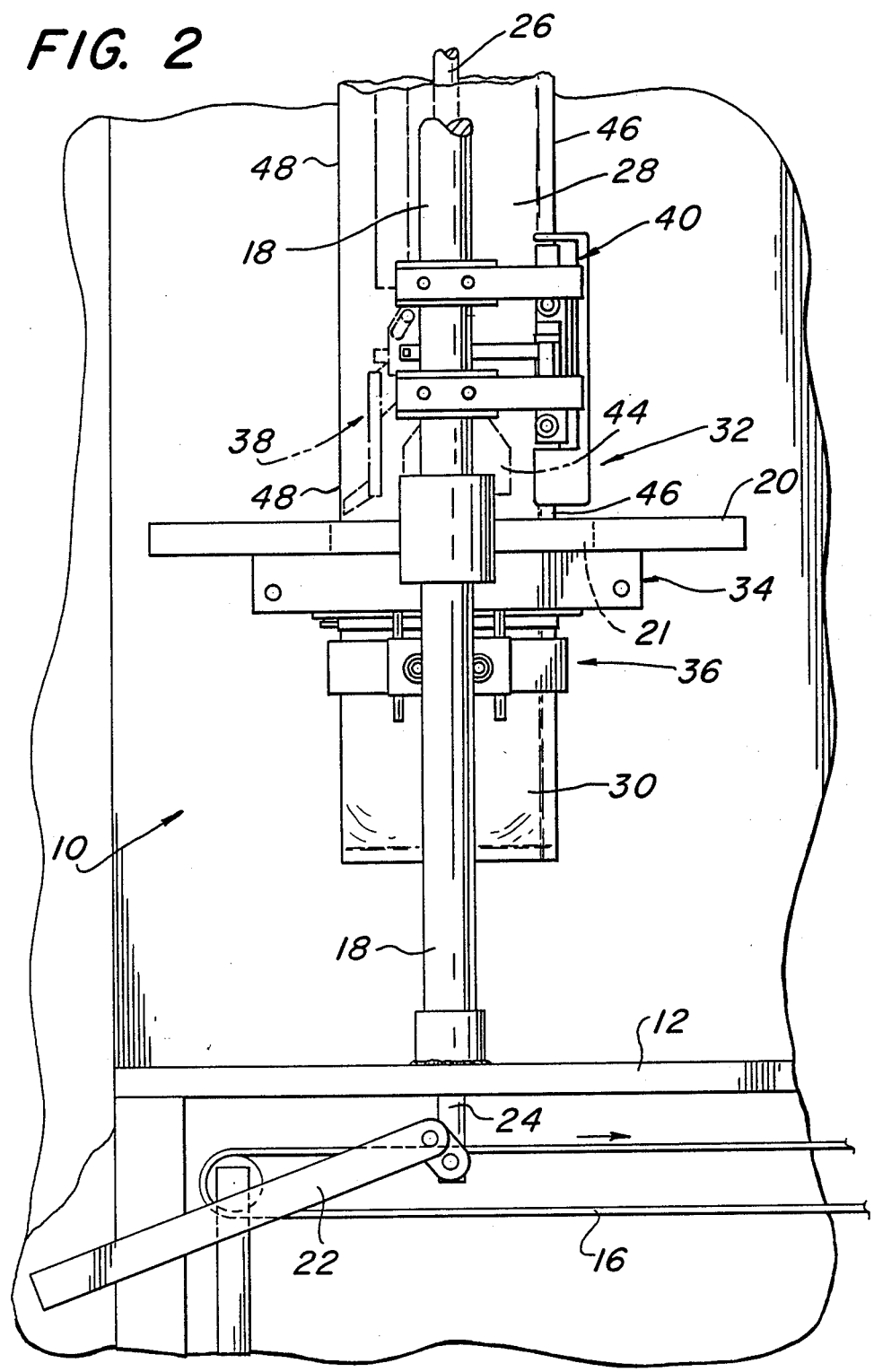
FIG. 2 is a side elevational view of the machine made according to the present invention.

Referring to FIGS. 1 and 2, machine 10 generally comprises a base 12 having an opening 14 therethrough. A conveyor 16 is located within the opening 14. A pair of fixed guide rods 18 are perpendicularly mounted on base 12. A carriage 20 is mounted between guide rods 18 so that carriage 20 may reciprocate up and down. A bell crank mechanism 22 is located below base 12 and is driven by a motor (not shown). Push rods 24 interconnect carriage 20 and bell crank mechanism 22 so that mechanism 22 can reciprocate carriage 20 on rods 18. The top dead center position of carriage 20 is shown in solid lines in FIG. 1; the bottom dead center position of the carriage is shown in phantom in FIG. 1.

A sleeve 28 is shown at the uppermost end of machine 10. Sleeve 28 is formed in a known manner from a web of thermoplastic material (not shown). See U.S. Pat. No. 3,894,381 incorporated herein by reference. A filling tube 26 is located within sleeve 28.

A mechanism 32 for equalizing the length of the web is located between rods 18 above carriage 20. Mechanism 32 comprises a spreading mechanism 38 and a dynamic clamping mechanism 40. See FIG. 2. Mechanism 32 ensures that equal lengths of web are on either side of filling tube 26 so that pleating at the horizontal seams is avoided. The structure and operation of mechanism 32 will be discussed in greater detail below.

A mechanism 34 for forming horizontal seals depends from carriage 20. Mechanism 34 comprises sealing jaws 43 and a mechanism 44 for horizontally stretching the sleeve. The sealing jaws 43 form horizontal seals, i.e. the top and bottom seals of the pouches. The mechanism 44 further ensures that pleating at the horizontal seals is avoided. The structure and operation of mechanism 34 will be discussed in greater detail below.

Mechanism 36 for deflating gas in the head space of a filled pouch 30 depends from carriage 20 and is located below mechanism 32. Such deflating mechanisms are known in the art. The structure and operation of mechanism 36 will be discussed in greater detail below.

In general, machine 10 operates as follows:

A web of thermoplastic material, in the form of a sheet, is folded in half in the longitudinal direction (not shown but note FIG. 1 of U.S. Pat. No. 3,894,381). The free edge portions of the web are sealed together, thereby forming a continuous sleeve 28. The sleeve is formed around filling tube 26 so that tube 26 is located within the sleeve (note FIG. 2). The sleeve engages mechanism 32. The side sealed edge portion 46 of sleeve 28 engages the dynamic clamping mechanism 40 and the folded portion 48 engages the spreading mechanism 38. Mechanism 32, as discussed below, spreads the sleeve between the sealed edge portion and the folded edge portion to ensure that equal lengths of web are located on either side of the filling tube 26.

The sleeve, after leaving the mechanism 32, engages mechanism 34. Mechanism 34, carried below carriage 20, receives the sleeve when carriage 20 is at the top dead center position. In the top dead center position, mechanism 32 and mechanism 34 are in close proximity, i.e. carriage 20 has an opening 21 therethrough which is sufficiently large to allow mechanism 32 to enter opening 21 so that it is next to mechanism 34.

As mechanism 34 forms the bottom seal of the pouch in sleeve 28, the pouch is filled with fluid from tube 26. Additionally, carriage 20 moves from its top dead center position to its bottom dead center position and pulls the sleeve with it. Furthermore, the top seal of the previously filled pouch is formed as the bottom seal is formed and the pouch is separated from the top pouch.

When carriage 20 reaches the bottom dead center position, mechanism 34 disengages sleeve 28 thereby allowing the bottom pouch 30 that has been filled and sealed at the top to drop to conveyor 16. The filled pouch that has no top seal is still connected to sleeve 28. Carriage 20 returns to its top center position. Mechanism 34 then engages the sleeve and the operation is repeated.

At the top dead center position, deflating mechanism 36 engages the filled pouch with no top seal ahead of engagement of mechanism 34 and thereby evacuates from the sleeve any gas above the fluid. Mechanism 36 continues to engage the pouch until mechanism 34 begins to retract. At that time, mechanism 36 also retracts.

Figure 3:
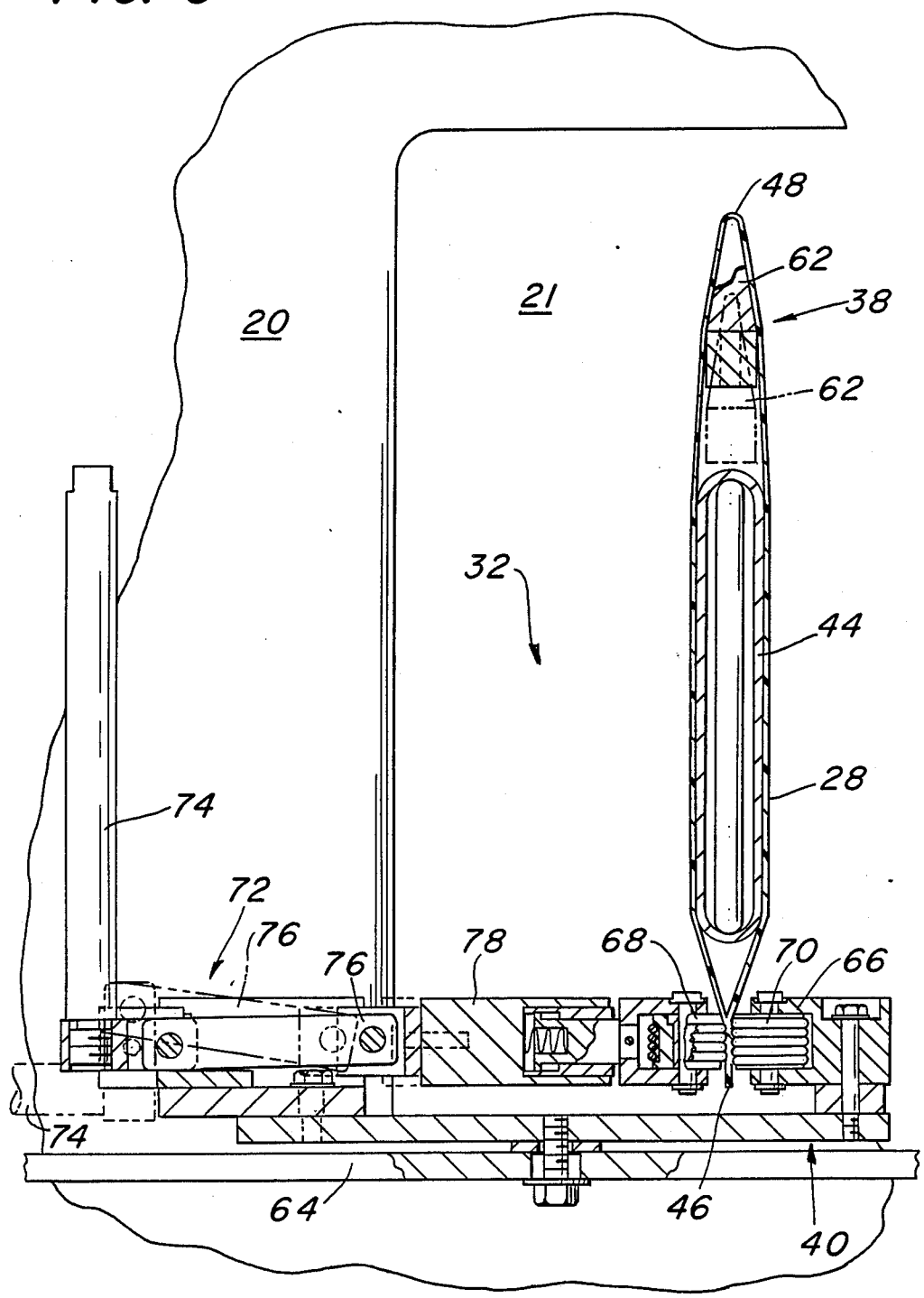
FIG. 3 is a sectional view taken generally along line 3—3 of FIG. 1.
Figure 4:
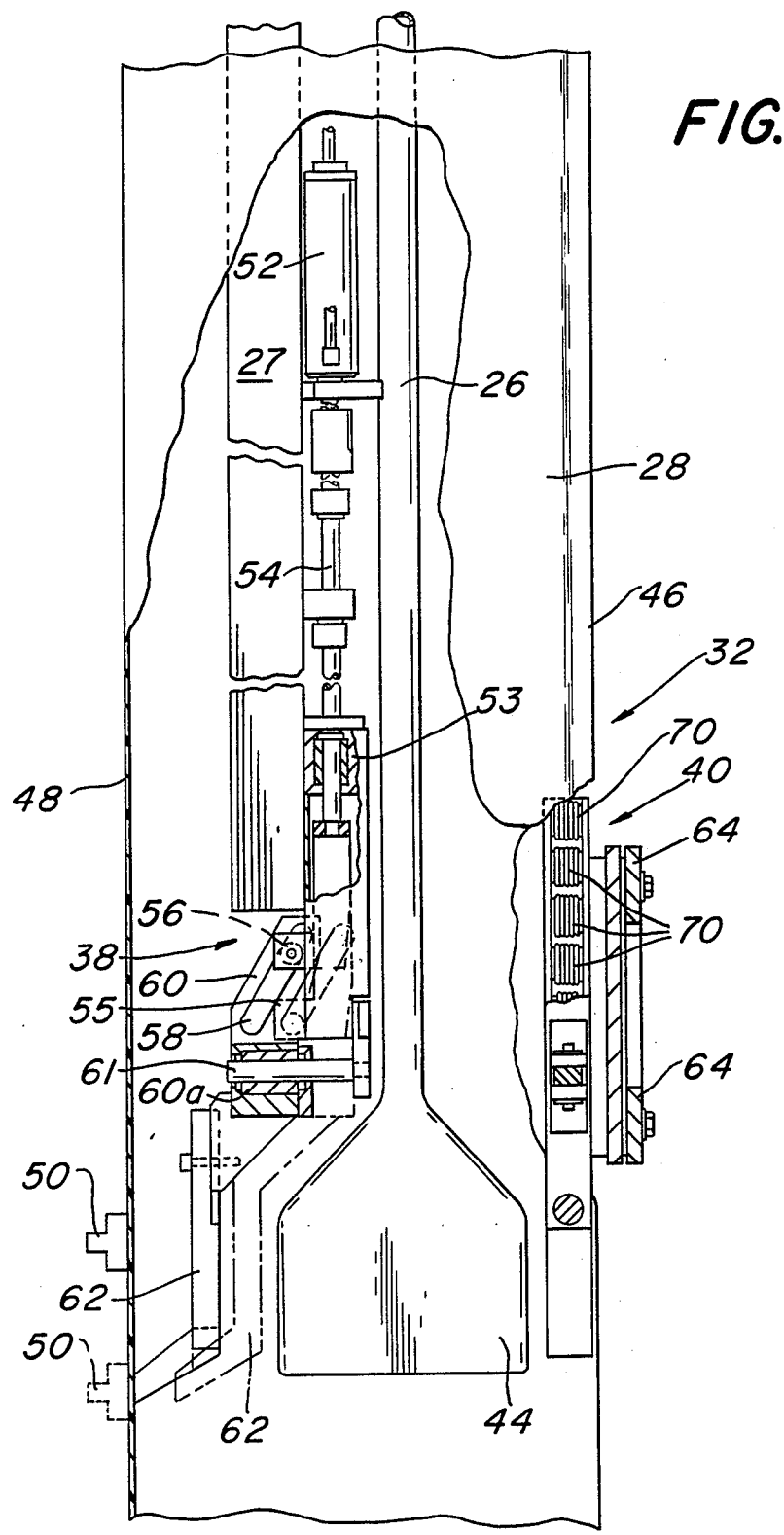
FIG. 4 is a sectional view taken generally along line 4—4 of FIG. 1.

Referring to FIGS. 3 and 4, mechanism 32 for equalizing the length of web is described in detail. Mechanism 32 comprises a spreading mechanism 38 and a dynamic clamping mechanism 40. Filling tube 26 is located within sleeve 28 and has a nozzle 44 at its lowermost end. Spreading mechanism 38 is located within sleeve 38 next to tube 26 and nozzle 44 and is adapted to engage the folded edge portion 48 of sleeve 28. Dynamic clamping mechanism 40 is located outside the sleeve 28 and is adapted to engage the sealed edge portion 46. Spreading mechanism 38 and dynamic clamping mechanism 40 cooperates to spread sleeve 28 between folded edge portion 48 and sealed edge portion 46 to ensure that equal lengths of web are on either side of nozzle 44. Mechanism 40 fixes the position of sealed edge portion 48 and mechanism 38 biases the folded edge portion away from mechanism 40. Mechanism 40 also ensures that the sealed edge portion is always delivered to the same spot on jaws 43 by continuously engaging the sealed edge portion while it moves from the sleeve former to the jaws. This continuous engagement provides constant control of the position and attitude of the sealed edge portion.

Spreading mechanism 38 depends from machine 10 in a known manner. Spreading mechanism 38, as shown in FIG. 4, is preferred and is referred to hereinafter as a dynamic spreader because it is movable between a first position, i.e. disengaged from the folded edge portion 48, (shown in phantom) and a second position, i.e. engaged with the folded edge portion (shown in solid). The dynamic spreader is used when a fitment 50 is sealed to the folded edge portion of the sleeve. See U.S. Pat. Nos. 3,894,381 and 4,246,062 for exemplary methods and machines for attaching fitments to pouches. If no fitment is sealed to the pouch or if the fitment is not sealed at the folded edge portion, then a leaf spring spreader (not shown) may be used. Such a leaf spring spreader is mounted at one end to tube 26 and its free end continuously engages the folded edge portion and biases that portion away from the dynamic clamping mechanism.

The dynamic spreader 38 comprises: A cylinder 52, e.g. hydraulic or pneumatic, mounted between tube 26 and member 27 that are connected to machine 10. A rod 54 from cylinder 52 is coupled through a linear bearing 53 to L-shaped yolk arm 55 that carries a pair of rollers 56. An actuator block 60 is slidably mounted via a linear bearing 60a on a horizontal pin 61 and has a slanted slot 58 on each side of arm 55 that is engaged by rollers 56. A boot 62 is connected to block 60. Upward travel of rollers 56 within slot 58 causes boot 62 to engage the folded edge portion. Downward travel of rollers 56 within slot 58 causes boot 62 to disengage the folded edge portion. Engagement and disengagement is controlled in such a manner that boot 62 does not engage the folded edge portion with a fitment sealed thereto.

Dynamic clamping mechanism 40 is carried on rods 18 by members 64 (see FIG. 1) and fixes the position of the sealed edge portion 46 of sleeve 28. Two embodiments of the dynamic clamping mechanism may be used; the first is shown in FIGS. 3 and 4, and the second is the known clamp comprising two endless chains, one chain carrying a plurality of pins and the other carrying a plurality of sockets that mate with the pins. For the second clamp mechanism see U.S. patent application Ser. No. 389,098, filed June 16, 1982, entitled "Apparatus And Method For Making a Flexible Pouch" by W. C. Christine, now abandoned which is incorporated herein by reference. The first dynamic clamping mechanism is preferably used in the manufacture of three side fin pouches up to 2 liters in size. The second dynamic clamping mechanism is preferably used in the manufacture of three side fin pouches 2 liters and up in size.

Mechanism 40, shown in FIGS. 3 and 4, comprises fixed roller set 66 and movable roller set 68. The sealed edge portion 46 is engaged between the roller sets. Each roller set comprises at least one roller 70 which carries a plurality of O-rings 72 that frictionally engage the sealed edge portion. The number of rollers used in a set depends upon the size of the pouch. For example, the small pouch (3 to 4 ounces) requires only one pair of rollers, a larger pouch (4 liters) requires more rollers (e.g. 12 pairs of rollers). In larger pouches, however, the roller embodiment of the dynamic clamp is not preferred because it pulls the sleeve into rollers.

Movable roller set 68 is moved between an opened position and a closed position by locking mechanism 72. Locking mechanism 72 comprises a bent lever 74 coupled to a linkage 76. Linkage 76 is coupled to member 78 which carries the spring biased rollers of the movable set 68. The locked (closed) position is shown in solid lines and the unlocked (opened) position is shown in phantom.

Mechanism 40 is not used to pull the sleeve through the machine 10. Accordingly, mechanism 40 is not driven by any motor or the like. Sleeve 28, instead, is pulled through the machine 10 by the action of the reciprocating carriage 20.

Figure 5:
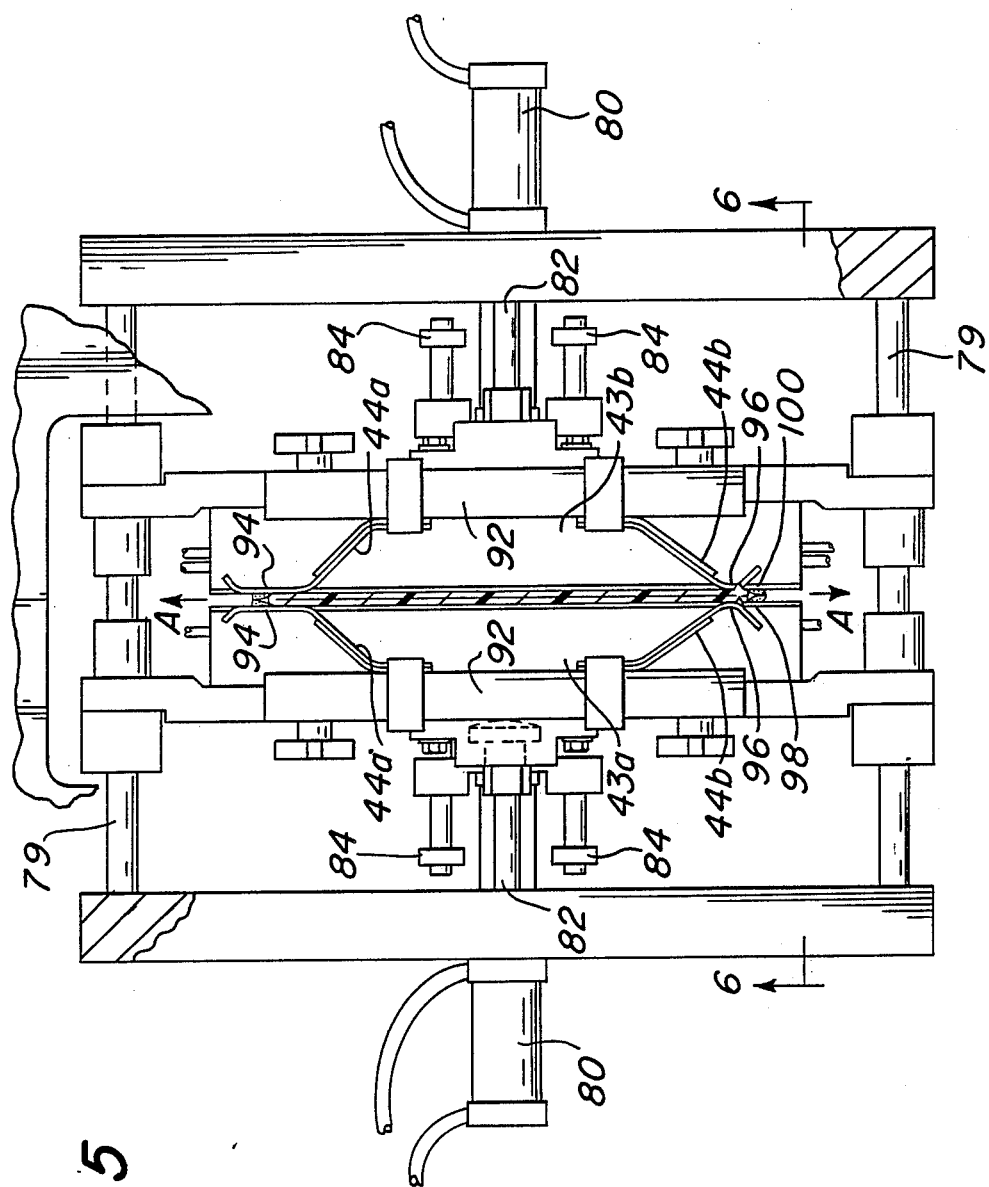
FIG. 5 is a sectional view taken generally along line 5—5 of FIG. 1.
Figure 6:
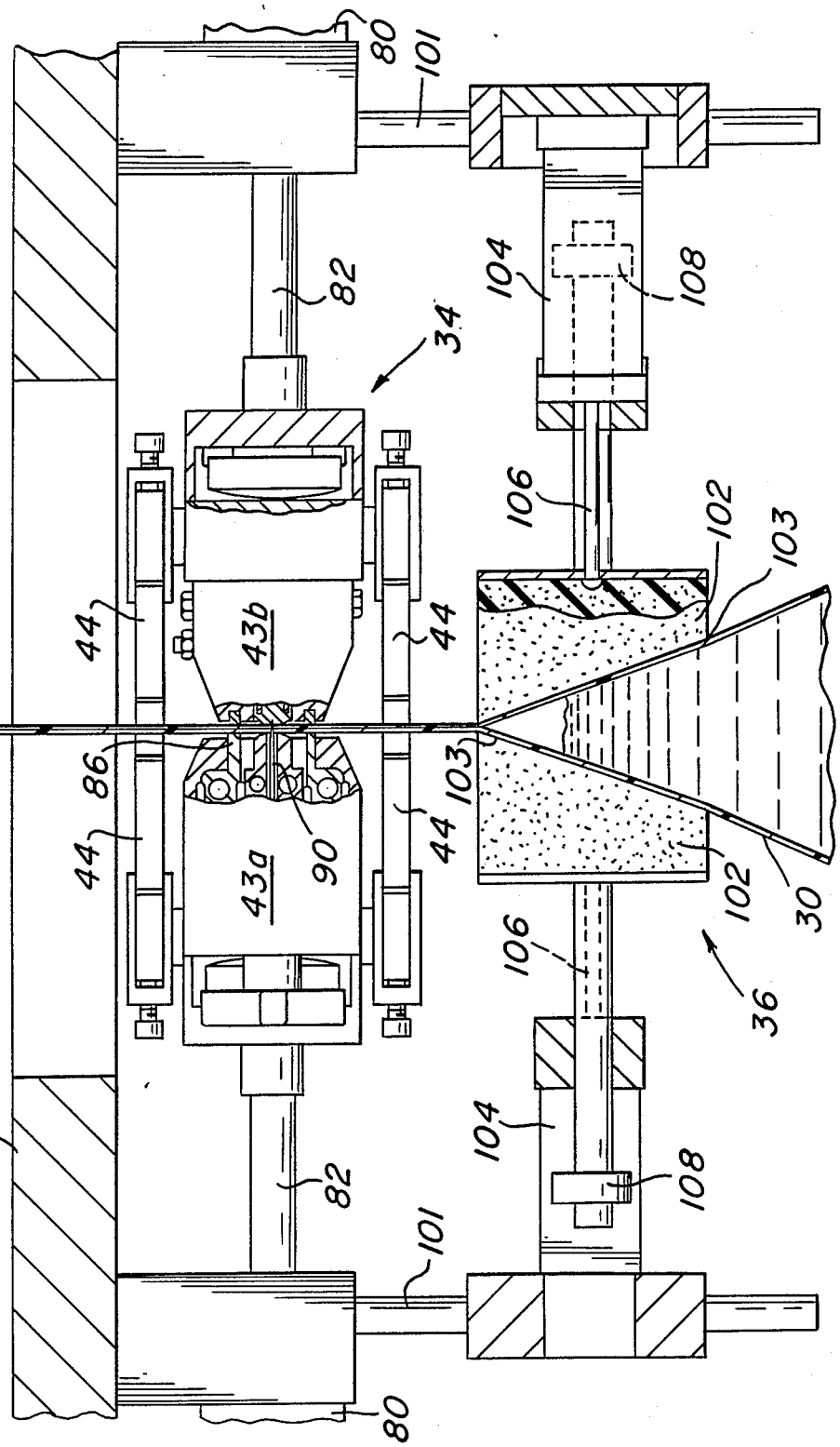
FIG. 6 is a sectional view taken generally along line 6—6 of FIG. 5.

Referring to FIGS. 5 and 6, mechanism 34 for forming the horizontal seals is described in detail. Mechanism 34 comprises sealing jaws 43 and a mechanism 44 for stretching the sleeve. Mechanism 44 is mounted on and travels with jaws 43.

Jaws 43 have a heat element side 43(a) and an anvil side 43(b). Sides 43(a) and 43(b) are carried on guides 79 and are movable toward and away from one another by cylinders 80, e.g. hydraulic or pneumatic. Cylinders 80 are connected to their respective jaws by rods 82. Forward travel of the sides may be limited by stops 84. Side 43(a) has a pair of horizontal parallel spaced apart heat elements 86, 88. Of course, other known sealing methods, e.g. gluing or ultrasonic welding, may be used. Element 86 forms the bottom horizontal seal of the pouch being filled. Element 88 forms the top horizontal seal of the filled pouch. A cutter 90 is positioned between elements 86, 88 and cuts the filled completely sealed pouch 30 from the pouch being filled.

The mechanism 44 for stretching the sleeve comprises a plurality of spreading fingers 44, i.e. four pairs of spring fingers. Four fingers are positioned above the jaws and four fingers are positioned below the jaws. See FIGS. 5 and 6. The fingers above and below the jaw are mirror images, so only the upper fingers will be discussed in detail.

Fingers 44 (see FIG. 5) engaged the sleeve. Fingers 44 are generally S-shaped leaf springs which are fixed at one end to member 92. Fingers 44(a) include an elongated flat portion 94. Folded edge portion 48 is grasped between elongated portions 94 of fingers 44(a). Fingers 44(b) include a bent portion 96. One bent portion may have a pin 98 and the other a socket 100. Preferably, the pin 48 will not puncture the selvage. Sealed edge portion 46 is grasped between bent portions 96.

The spring force of fingers 44(b) which engage the sealed edge portion should be between about 1½ to about 2 times greater than the spring force of fingers 44(a) which engage the folded edge portion. For example, fingers 44(b) may have a spring force of about 25 pounds and fingers 44(a) may have a spring force of about 12 pounds. All the fingers 44 are preferably adjustable, e.g. leafs may be added or subtracted to increase or decrease the spring force. The spring force of fingers 44 will depend, in part, on the material comprising the sleeve. For example, a simple film material of low density polyethylene requires less spring force than a complex film having multiple layers, perhaps including aluminum foil, because the simpler film does not resist flattening and stretching.

To maximize the gripping strength of fingers 44(b), it may be advantageous to have two parallel seals at the sealed edge portion instead of the typical single seal. The second seal is located along the outermost edge portion of the sealed edge portion and has a surface with a coefficient of friction greater than that of the film. This second seal ensures that the tensioning force created by the fingers 44(b) is effectively transferred to the sealed edge portion of the sleeve.

As jaws 43 are moved together, the fingers 44 engaged the sleeve in advance of the jaws. Further travel of the jaw towards one another causes the fingers to spread (or tension) the sleeve in an outwardly direction (see arrow A in FIG. 5).

Figure 7:
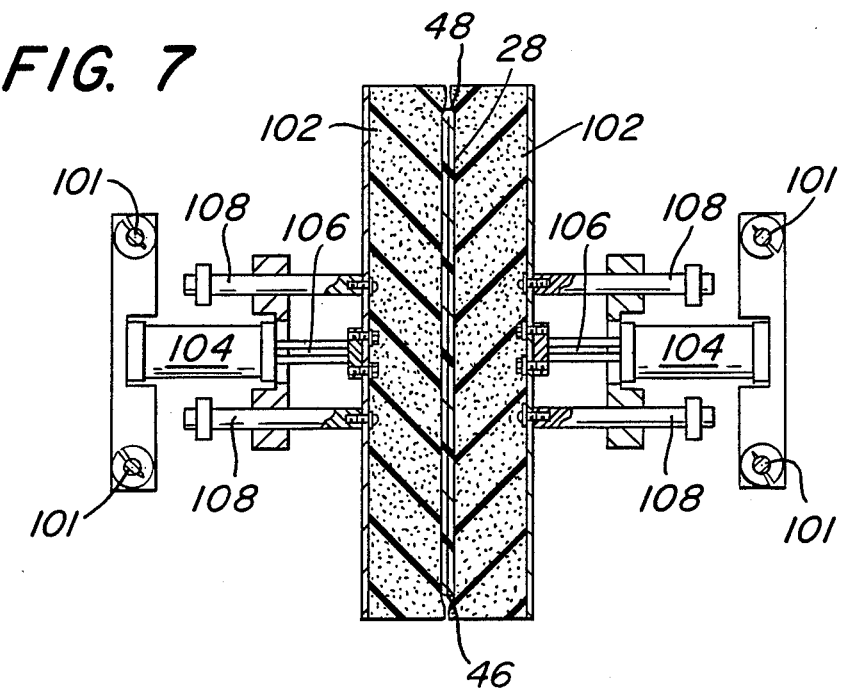
FIG. 7 is a sectional view taken generally along line 7—7 of FIG. 1.

Referring to FIGS. 6 and 7, the mechanism 36 for deflating is described. Mechanism 36 is carried by carriage 20 and is located below mechanism 34. Mechanism 36 is connected to carriage 20 via rods 101. Mechanism 36 may be adjusted up or down in relation carriage 20 and may be adjusted horizontally toward or away from one another and its actuation can be controlled independently of other operations. Mechanism 36 comprises a pair of foam pads 102 that have a slanted face 103 which are movable toward and away from one another. Movement of pads 102 is controlled by cylinders 104, e.g. hydraulic or pneumatic, that are connected to the pads by rods 106. Forward motion of pads 102 may be limited by stops 108.

Figure 8:
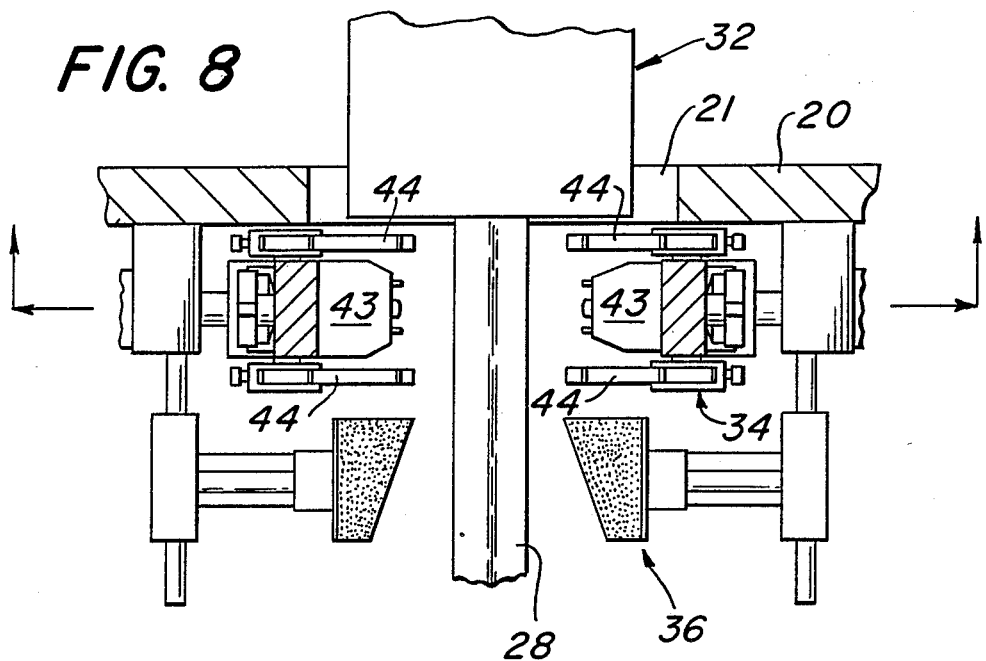
FIGS. 8–9 are operational views illustrating, in part, the operation of the machine.
Figure 9:
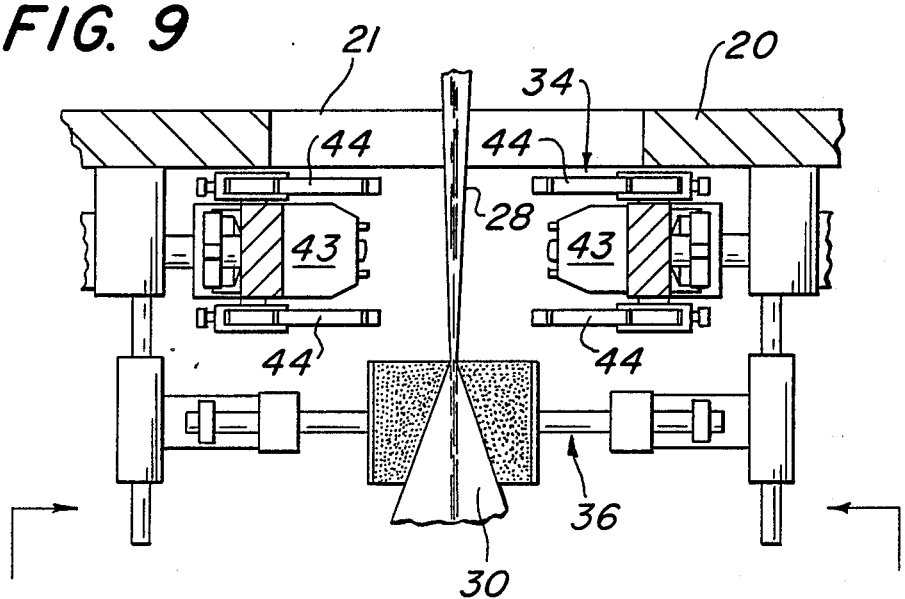

The operation of machine 10 will be described with reference to FIGS. 1 and 8–9. Sleeve 28 enters mechanism 32 where it is spread between the folded edge portion and the sealed edge portion to ensure that equal lengths of web are on either side of tube 26 and nozzle 44. The sealed edge portion engages the clamping mechanism 40 and the folded portion engages spreader mechanism 38.

The sleeve 28 leaves mechanism 32. Carriage 20 is at the top dead center position. Mechanism 32 is closely adjacent upper fingers 44. See FIG. 8. Deflating mechanism 36 and sealing mechanism 34 are in their respective retracted positions. Deflating mechanism 36 closes on sleeve 28 ahead of mechanism 34 thereby forcing out any gas in the lowermost pouch. See FIG. 9. Sealing mechanism 34, then, begins to close on sleeve 28. Spreading fingers 44 that extend beyond the sealing faces of jaws 43 engage the sleeve first. The fingers grasp the sleeve and spread it outwardly, thereby eliminating any pleats. The jaws 43 then contacts the sleeve 28. Jaws 43 form the horizontal seals and the cutter 90 severs the pouches. Fractions of a second after the jaws close on the sleeve, fluid is filled in the upper pouch. Carriage 20 moves to the bottom dead center position pulling the sleeve with it. See FIG. 1. At bottom dead center position, deflating mechanism 36 and sealing mechanism 34 simultaneously disengage filled pouch 30. Carriage 20 then returns to the top dead center position. This procedure is repeated.

The present invention may be embodied in other specific forms without departing from the spirit or essential attributes thereof and, accordingly, reference should be made to the appended claims, rather than to the foregoing specifications, as indicating the scope of the invention.

We claim:

1. A vertical form, fill, seal machine for producing filled three side fin pouches comprising: means for forming a sheet of thermoplastic material into a sleeve having a folded edge portion and a side sealed edge portion; means for moving the formed sleeve down the outside of a filling tube; means for spreading apart the sleeve between said folded edge portion and said side sealed edge portion so that equal lengths of thermoplastic material may be subsequently sealed together, said spreading means further comprising means for engaging the folded edge of said sleeve and selectably releasing the engaging means while the sleeve moves, and means for clamping the side sealed edge portion of said sleeve, said clamping means including at least one pair of rollers for clamping said side edge portion therebetween; means for sealing shut said sleeve between said folded edge portion and said side sealed edge portion; means for filling said sleeve through the filling tube; means for sealing said sleeve shut after filling thereby forming the filled three side fin pouch; and means for separating the filled three side fin pouch from said sleeve.

2. A vertical form, fill, seal machine for producing filled three side fin pouches having filaments sealed thereto, comprising: means for forming a sheet of thermoplastic material having a series of fitments sealed thereto into a sleeve having a folded edge portion and a side sealed edge portion; means for spreading apart the formed sleeve between said folded edge portion and said side sealed edge portion so that equal lengths of thermoplastic material may be subsequently sealed together and releasing the sleeve when a fitment is adjacent the spreading means; means for grasping said folded edge portion and said side sealed edge portion and for tensioning said sleeve between said folded edge portion and said side sealed edge portion; means for sealing shut said sleeve between said folded edge portion and side sealed edge portion; means for filling said sleeve; means for sealing shut said sleeve after filling thereby forming the filled three side fin pouch; and means for separating the filled three side fin pouch from said sleeve.

3. A vertical form, fill, seal machine for producing filled three side fin pouches having filaments therein, comprising: means for forming a sheet of thermoplastic material having a series of fitments sealed thereto into a sleeve having a folded edge portion and a side sealed edge portion; means for moving the sleeve down the outside of a filling tube; means for spreading apart the sleeve between said folded edge portion and said side sealed edge portion so that equal lengths of thermoplastic material may be subsequently sealed together, said spreading means further comprising means for engaging said folded edge portion of said sleeve and releasing the spreading means when a fitment is near the spreading means, said engaging means including a dynamic spreading mechanism movable between engagement and disengagement with said folded edge portion, and means for clamping said side sealed edge portion of said sleeve, said clamping means including at least one pair of rollers for clamping said side sealed edge portion therebetween; means for grasping said folded edge portion and said side sealed edge portion and for tensioning said sleeve between said folded edge portion and said side sealed edge portion; means for sealing shut said sleeve between said folded edge portion and said side sealed edge portion; means for filling said sleeve through said filling tube; means for sealing shut said sleeve after filling thereby forming the filled three side fin pouch; and means for separating the filled three side fin pouch from said sleeve.

4. The machine according to claims 1, 2, or 3 further comprising: means for deflating a filled pouch before the pouch is sealed shut, said deflating means including a pair of foam pads disposed on either side of the sleeve, said pads being selectably movable toward and away from one another independently of the means for sealing shut said sleeve, each foam pad having a slanted face.

5. The machine according to claims 1 or 2 wherein said means for engaging said folded edge portion of said sleeve further comprises a dynamic spreading mechanism movable between engagement and disengagement with said folded edge portion.

6. The machine according to claims 1 or 2 or 3 wherein said means for clamping said side sealed edge portion of said sleeve further comprises:
a movable roller set and a non-movable roller set, said sealed edge portion of said sleeve being engaged between said roller sets.

7. The machine according to claims 2 or 3 wherein said means for grasping and for tensioning further comprises: a plurality of spreading fingers affixed to said first and second means for sealing shut.

8. In a vertical form, fill, seal machine having sealing jaws for producing filled three side fin pouches from a sleeve of thermoplastic material having a folded edge portion and a sealed edge portion, wherein the improvement comprises: four pairs of spreading fingers mounted on the sealing jaws, two pairs of spreading fingers positioned above the jaws, one pair engaging the sealed edge portion and the other pair engaging the folded edge portion, and two pairs of said spreading fingers positioned below the jaws, one pair of spreading fingers engaging the sealed edge portion and the other pair engaging the folded edge portion, said fingers grasping and tensioning said sleeve therebetween, said pairs of fingers engaging the sealed edge portion having a greater spring force than said pairs of fingers engaging the folded edge portion.

9. The machine according to claim 8 wherein each said finger is a leaf spring.

10. The machine according to claim 8 wherein said pairs of fingers engaging the folded edge portion each have an elongated flat portion that engages the folded edge portion.

11. The machine according to claim 8 wherein said pair of fingers engaging the sealed edge portion each have a bent portion that engages the sealed edge portion.

12. The machine according to claim 11 wherein one bent portion has a pin and the other a socket.

13. A vertical form, fill, seal machine for producing filled three side fin pouches having filaments therein from a sleeve of thermoplastic material having a series of fitments sealed thereto and a folded edge portion and a sealed edge portion, wherein the improvement comprises: means for spreading apart the sleeve between said folded edge portion and said side sealed edge portion so that equal lengths of thermoplastic material may be subsequently sealed together, said spreading means further comprising means for engaging said folded edge portion and releasing the sleeve when a fitment is adjacent the engaging means, and means for clamping said side sealed edge portion, said clamping means including at least one pair of rollers for clamping said side sealed edge portion therebetween.

14. The machine according to claim 13 wherein said means for engaging said folded edge portion of said sleeve further comprises a dynamic spreader mechanism movable between engagement and disengagement with said folded edge portion.

15. The machine according to claim 13 wherein said means for clamping said side sealed portion of said sleeve further comprises: a movable roller set and a non-movable roller set, said sealed edge portion being engaged between said roller sets.

16. A method for forming, filling and sealing a sleeve of thermoplastic material having a folded edge portion and a said side sealed edge portion into a filled three side fin pouch having a fitment therein, comprising the steps of: providing a continuous sleeve having a fitment disposed thereon; spreading said sleeve between said folded edge portion and said side sealed edge portion so that equal lengths may be subsequently sealed together by clamping the sealed edge portion and providing a biasing force against the folded edge portion away from the clamped sealed edge portion; releasing the biasing force in the area of the sleeve adjacent to the fitment; grasping and tensioning the sleeve between said folded edge portion and said side sealed portion; sealing a bottom horizontal seal in the sleeve; filling said sleeve with fluid as said bottom seal is formed; sealing a top horizontal seal in a fluid filled sleeve so that the filament is disposed between the top and bottom horizontal seals, and thereby forming the filled three side fin pouch having at least one fitment; and severing the filled three side fin pouch from said sleeve.

17. The method according to claim 16 further comprising the step of deflating the filled sleeve before the top horizontal seal is made.

18. A method of preventing pleating in the sleeve formed within a vertical form, fill, seal machine of the type having sealing jaws for producing filled three side fin pouches with fitments from a sleeve of thermoplastic material having a folded edge portion and a sealed edge portion, and further having a filling tube disposed within the sleeve and adapted to introduce material to be packaged into the sleeve, comprising the steps of:
forming the sleeve around the filling tube;
moving the sleeve longitudinally down the tube as pouches are formed at the end of the tube;
urging a member against the folded edge portion of the sleeve as the sleeve moves down the filling tube; and
releasing the urging of the member from the folded edge portion of the sleeve when a fitment on the sleeve passes near the urging member.

* * * * *